(12) United States Patent
Lee et al.

(10) Patent No.: US 12,056,312 B2
(45) Date of Patent: Aug. 6, 2024

(54) DISPLAY APPARATUS

(71) Applicant: LG Display Co., Ltd., Seoul (KR)

(72) Inventors: MiReum Lee, Gyeonggi-do (KR); JaeHee Park, Gyeonggi-do (KR); Jonghyeok Im, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/976,585

(22) Filed: Oct. 28, 2022

(65) Prior Publication Data

US 2023/0205362 A1    Jun. 29, 2023

(30) Foreign Application Priority Data

Dec. 24, 2021  (KR) .......................... 10-2021-0187317

(51) Int. Cl.
*G06F 3/041*  (2006.01)
*G06F 3/044*  (2006.01)

(52) U.S. Cl.
CPC .......... *G06F 3/0418* (2013.01); *G06F 3/0412* (2013.01); *G06F 3/04164* (2019.05); *G06F 3/0443* (2019.05)

(58) Field of Classification Search
None
See application file for complete search history.

(56) References Cited

U.S. PATENT DOCUMENTS

| | | | |
|---|---|---|---|
| 2017/0235397 A1* | 8/2017 | Saitou | G02F 1/134309 345/174 |
| 2018/0348911 A1* | 12/2018 | Lee | G06F 3/0448 |
| 2020/0110497 A1* | 4/2020 | Jin | G06F 3/0446 |
| 2020/0201468 A1* | 6/2020 | Park | G06F 3/04166 |

FOREIGN PATENT DOCUMENTS

KR    20190047264 A    5/2019

* cited by examiner

*Primary Examiner* — Christopher R Lamb
(74) *Attorney, Agent, or Firm* — Seed IP Law Group LLP

(57) ABSTRACT

Disclosed is a display device comprising a substrate including a display area and a non-display area surrounding the display area, a plurality of signal link lines disposed in the non-display area of the substrate and configured to connect a plurality of signal lines of the display area to a pad portion configured to receive an external signal, a plurality of touch link lines disposed in the non-display area, overlapped with at least some of the plurality of signal link lines and configured to connect the pad portion to a plurality of touch lines in the display area, and a compensation pattern based on an overlap between at least one of the plurality of signal link lines and at least one of the plurality of touch link line corresponding to at least one of the plurality of touch lines.

23 Claims, 9 Drawing Sheets

DISPLAY APPARATUS

BACKGROUND

Technical Field

The present disclosure relates to a display device.

Description of the Related Art

With the advancement of an information-oriented society, attentions and requirements for a display device configured to display image have been increased in various types. Accordingly, a display device such as a Liquid Crystal Display (LCD), an organic light emitting display (OLED), a Micro Light Emitting Diode (Micro LED), a quantum dot display device (QD), or the like is utilized.

In order to provide various functions to a user, the display device senses a user's touch on a display panel and performs an input processing on the basis of the sensed touch.

In case of a touch sensible display device, for example, a touch driving signal is applied to a plurality of touch electrodes disposed or embedded on a display panel, and a change in capacitance generated by a user's touch may be sensed to detect a touch and a touch coordinate.

However, since signal lines applied with various signals and voltages for an image display are disposed in the display panel of the touch sensible display device, a parasitic capacitance may be generated between a signal line for the display driving and a touch line for the touch sensing, thereby degrading a touch sensing performance.

The above content of the background technology may be retained for a deduction of the present disclosure by inventors, or may be technology information learned by practice of embodiments of the present disclosure. However, the above content of the background technology may be not a prior art published to the general public before an application of the present disclosure.

BRIEF SUMMARY

The present disclosure has been made in view of the above problems, and it is an object of the present disclosure to provide a display device capable of compensating for a deviation of a capacitance caused by an overlap difference between a touch link line and a signal link line.

In accordance with an aspect of the present disclosure, the above and other objects can be accomplished by the provision of a display device comprising a substrate including a display area and a non-display area surrounding the display area, a plurality of signal link lines disposed in the non-display area of the substrate and configured to connect a plurality of signal lines of the display area to a pad portion applied with an external signal, a plurality of touch link lines disposed in the non-display area, overlapped with at least some of the plurality of signal link lines and configured to connect the pad portion to a plurality of touch lines in the display area, and a compensation pattern on the basis of the overlap between the plurality of signal link lines and the touch link line corresponding to at least one of the plurality of touch lines.

In addition to the effects of the present disclosure as mentioned above, additional advantages and features of the present disclosure will be clearly understood by those skilled in the art from the above description of the present disclosure.

BRIEF DESCRIPTION OF THE SEVERAL VIEWS OF THE DRAWINGS

The technical benefits, features and other advantages of the present disclosure will be more clearly understood from the following detailed description taken in conjunction with the accompanying drawings, in which.

DETAILED DESCRIPTION

Figure 1:
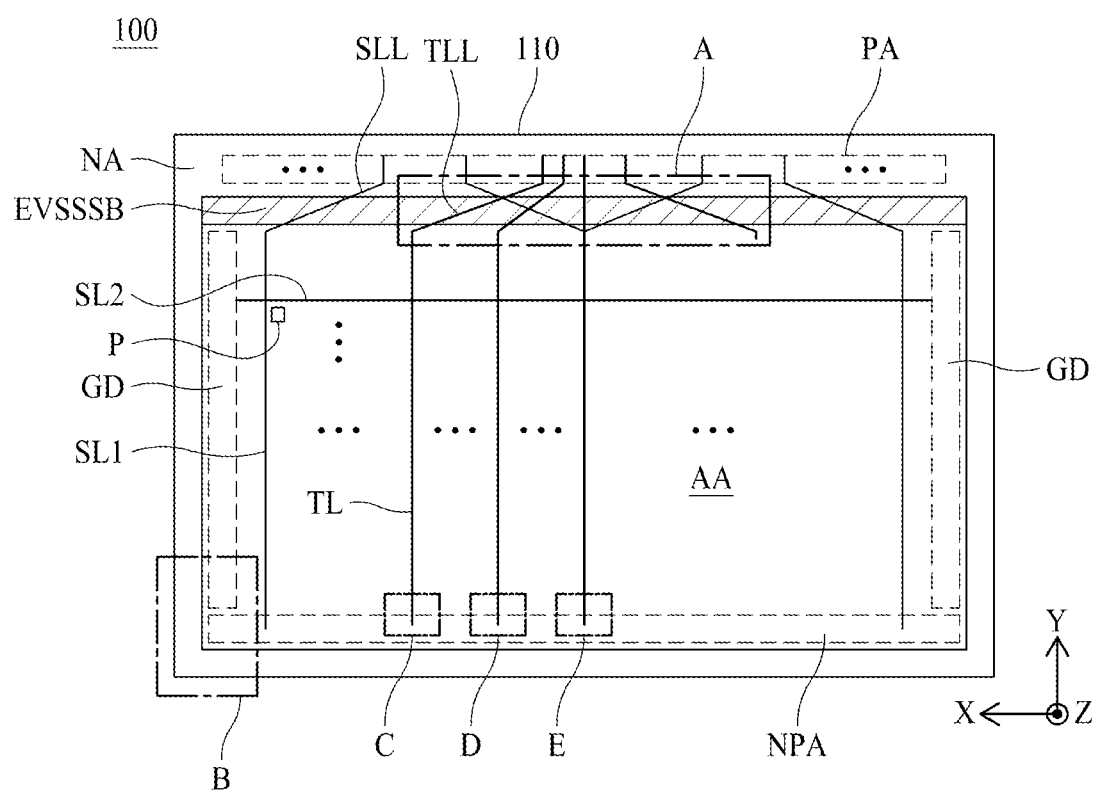
FIG. 1 is a plan view schematically illustrating a display device according to the embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~,' 'above~,'

'below~,' and 'next to~,' one or more portions may be arranged between two other portions unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first," "second," etc., may be used herein to describe various elements, these elements should not be limited by these terms. These terms are only used to partition one element from another. For example, a first element could be termed a second element, and, similarly, a second element could be termed a first element, without departing from the scope of the present disclosure.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, an embodiment of a display device according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

FIG. 1 is a plan view schematically illustrating a display device according to one embodiment of the present disclosure.

Hereinafter, the X-axis represents a direction parallel to a scan line, the Y-axis represents a direction parallel to a data line, and the Z-axis represents a height direction of the display device.

The display device according to one embodiment of the present disclosure is implemented as an organic light emitting display OLED device, but may also be implemented as a liquid crystal display LCD device, a micro light emitting diode LED display device, a quantum dot QD display device, and etc.

Figure 2:
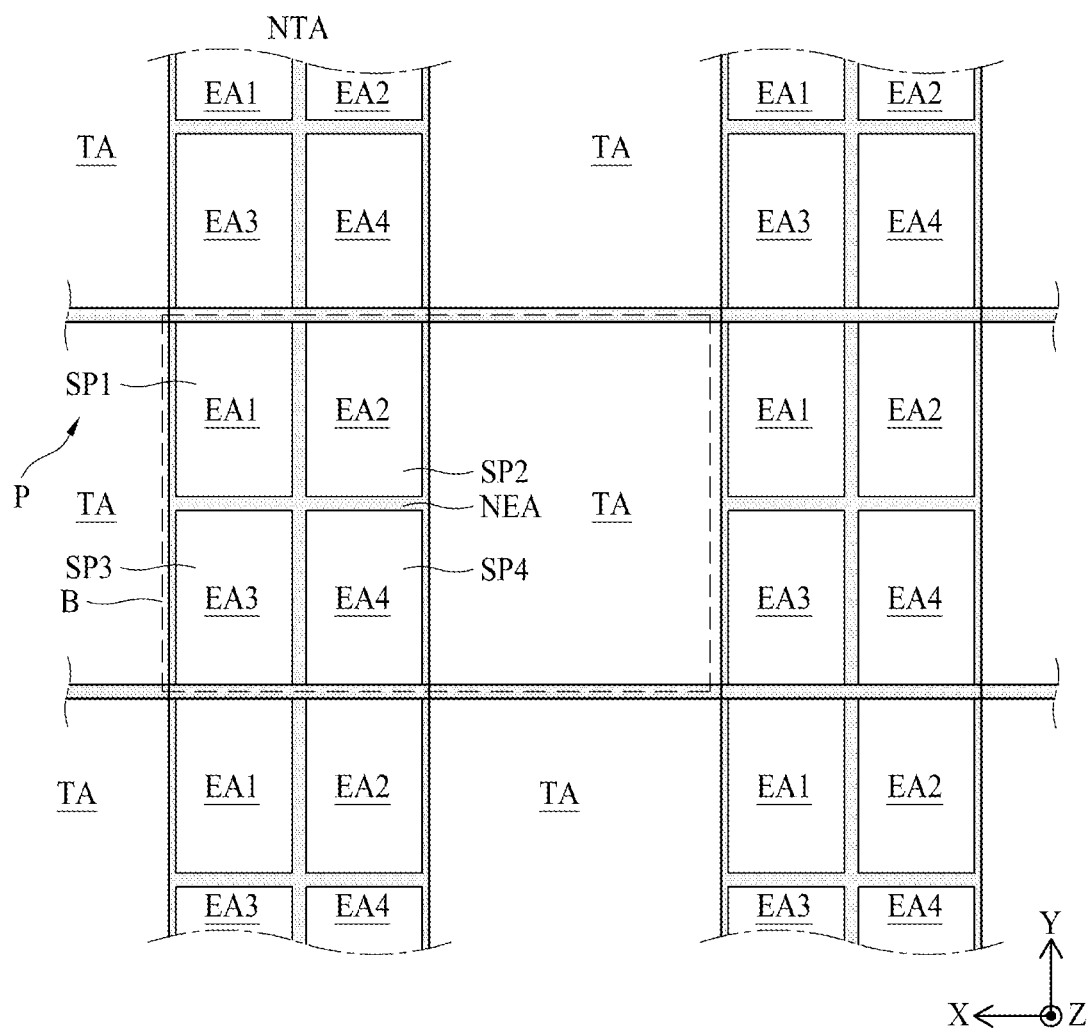
FIG. 2 is a plan view illustrating an example of a pixel in the display device according to the embodiment of the present disclosure.

Referring to FIGS. 1 and 2, the display device 100 according to the embodiment of the present disclosure may include a display panel 110 including a display area AA for displaying an image by pixels formed thereon, and a non-display area NA on which an image is not displayed.

In the display area AA of the display panel 110, there are first signal lines SL1, second signal lines SL2, and the pixels. In addition to the first signal line SL1, the second signal line SL2 and the pixel P, there are a touch sensor and a touch line TL for realizing a touch function.

The non-display area NA of the display panel 110 may include a pad portion PA in which pads to which an external signal is applied and at least one gate driver GD may be included. Also, the display panel 110 may include a non-pad portion NPA disposed in the non-display area NA facing the pad portion PA with the display area AA therebetween. For example, the non-pad portion NPA may be disposed in an opposite portion where the pad portion PA is disposed in the non-display area NA of the display panel 110. The non-pad portion NPA may be provided in the non-display area NA of the display panel 110 and may be disposed to be opposite to the pad portion PA with the display area AA interposed in-between.

Figure 6A:
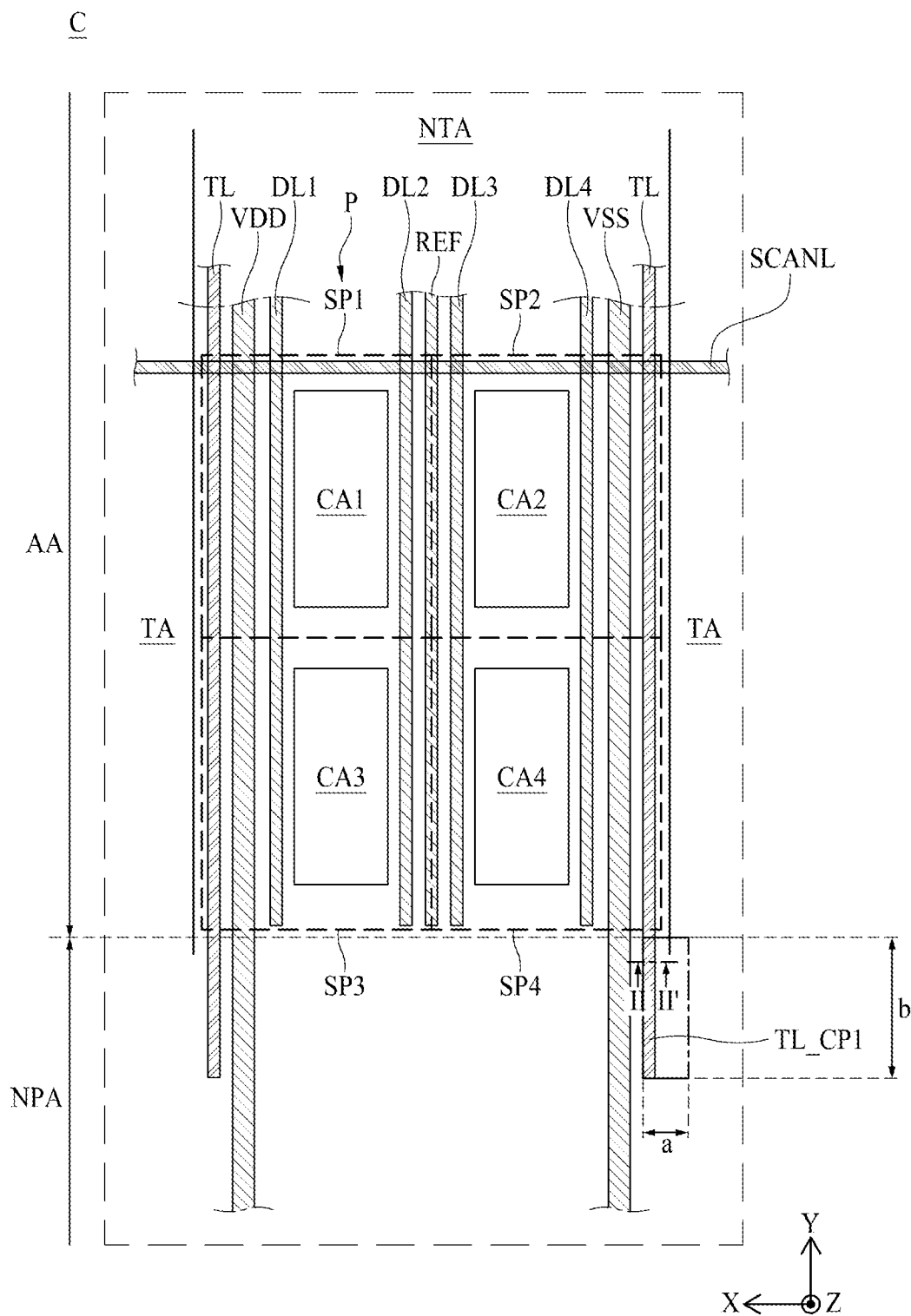
FIG. 6A is a plan view illustrating an example of a compensation pattern disposed in the area C of FIG. 1.
Figure 6B:
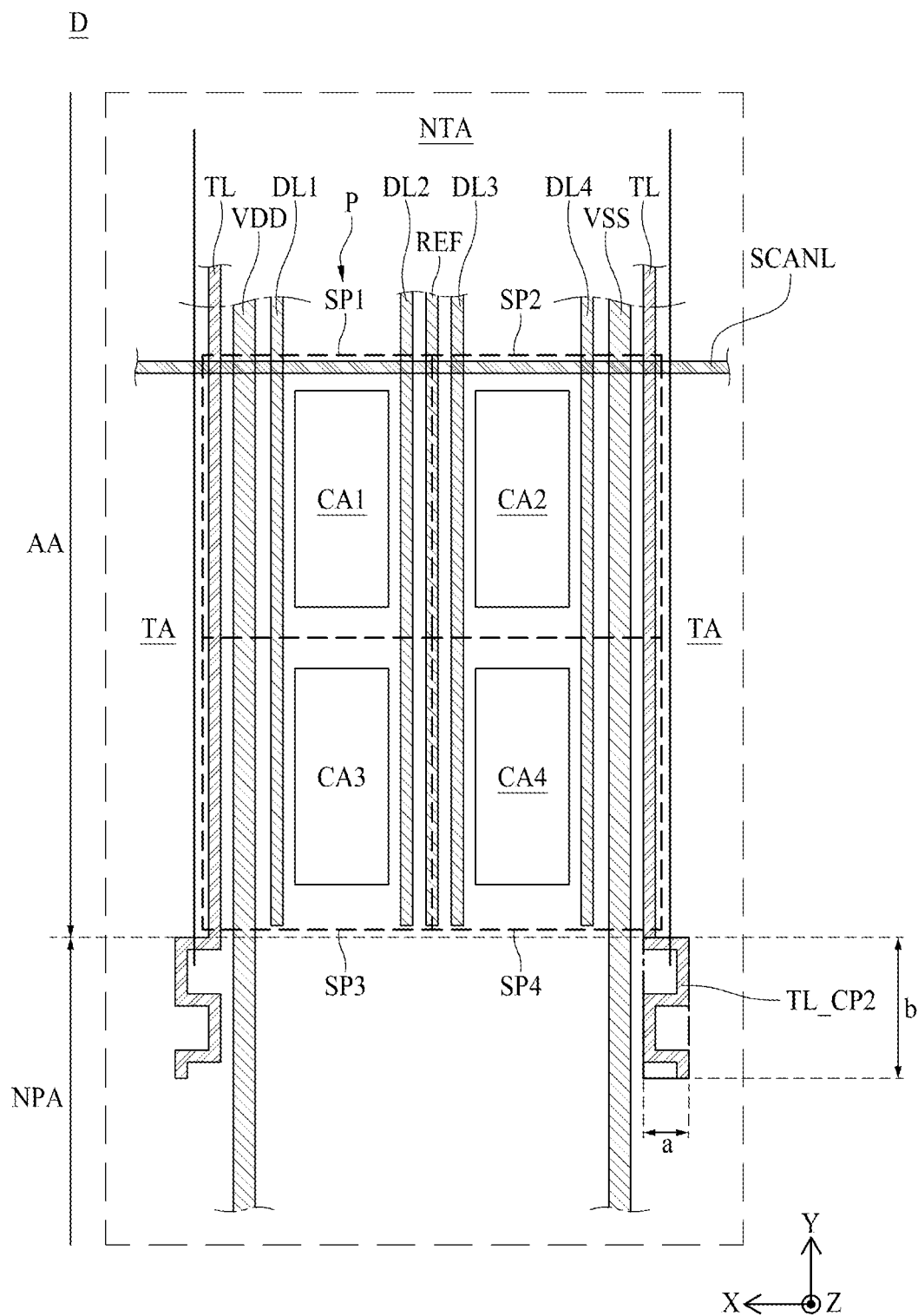
FIG. 6B is a plan view illustrating an example of a compensation pattern disposed in the area D of FIG. 1.
Figure 6C:
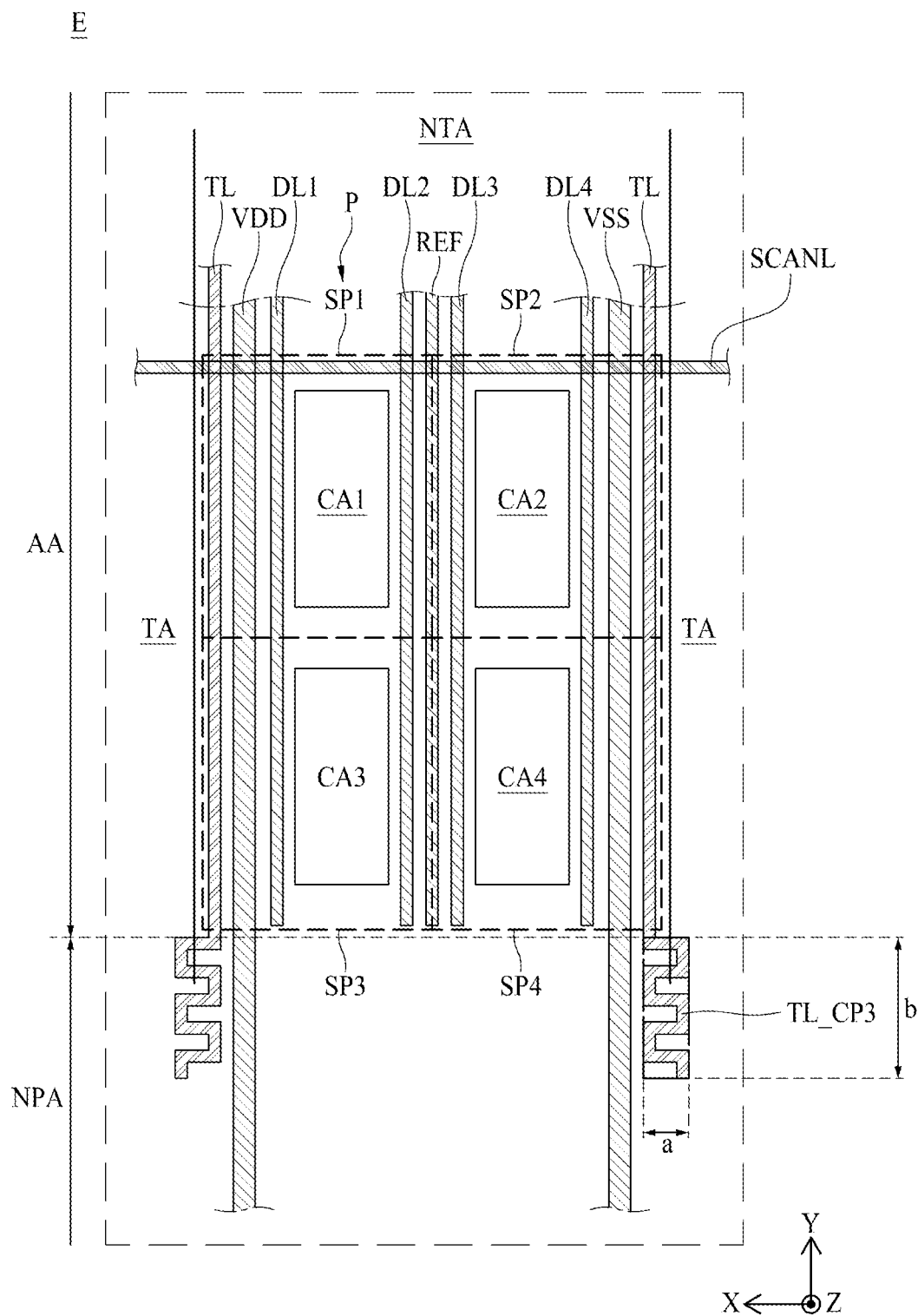
FIG. 6C is a plan view illustrating an example of a compensation pattern disposed in the area E of FIG. 1.

The first signal lines SL1 may extend in the first direction (or Y-axis direction) and may overlap, e.g., cross, the second signal lines SL2 in the display area AA. The second signal lines SL2 may extend in the second direction (or X-axis direction). The pixels are disposed in the area where the first signal line SL1 and the second signal line SL2 overlap, e.g., cross, each other and are configured to emit predetermined light in order to display an image. For example, the first signal lines SL1 may include at least one of a pixel power line VDD, a common power line VSS, a data line DL1, DL2, DL3 and DL4, and a reference line REF, as shown in FIGS. 6A to 6C. Also, the second signal lines SL2 may include scan lines SCANL as shown in FIGS. 6A to 6C. The scan line SCANL may supply a scan signal to subpixels SP1, SP2, SP3 and SP4 of the pixel P.

The gate driver GD may be connected to the scan line, to thereby supply the scan signal thereto. The gate driver GD may be implemented in a gate driver in panel (GIP) method or a tape automated bonding (TAB) method on one outer side or both outer sides of the display area AA of the display panel 110.

The pad portion PA of the display panel 110 may be electrically connected to a source drive integrated circuit, a circuit board, or a timing controller connected through a flexible circuit film.

The non-display area NA of the display panel 110 may include a plurality of signal link lines SLL for connection of the pad portion PA and the first signal lines SL1 disposed in the display area AA, and a plurality of touch link lines TLL for connection of the pad portion PA and the touch lines TL disposed in the display area AA. In addition, the non-display area NA of the display panel 110 may include a common power shorting bar EVSSSB disposed between the pad portion PA and the display area AA. The common power shorting bar EVSSSB may be overlapped with the plurality of signal link lines SLL and the plurality of touch link lines TLL. A detailed description of the plurality of signal link lines SLL and the plurality of touch link lines TLL and the common power shorting bar EVSSSB will be described later with reference to FIGS. 3 and 4.

According to one embodiment of the present disclosure, the display panel 110 may be a transparent display panel which enables to see objects or background located on a rear surface (or back surface) of the display panel 110 by transmitting light therethrough.

Referring to FIG. 2, the display area AA of the display device 100 according to one embodiment of the present disclosure may include a transmission area TA and a non-transmission area NTA.

The transmission area TA is the area which passes most of the light incident from the outside, and the non-transmission area NTA is the area which does not transmit most of the light incident from the outside. The display panel 110 may see objects or background located on a rear surface (or back surface) of the display panel 110 owing to the transmission areas TA.

The non-transmission area NTA may be disposed between the adjacent transmission areas TA, and the plurality of pixels P and the plurality of signal lines SL1 and SL2 may be disposed. The plurality of signal lines may include first signal lines SL1 extended in the first direction (or Y-axis direction) in the non-transmission area NTA and second signal lines SL2 extending in the second direction (or X-axis direction). The first signal lines SL1 may include at least one of the pixel power line, the common power line, the data line, and the reference line, and the second signal lines SL2 may include the scan lines, but not limited thereto.

As shown in FIG. 2, each of the pixels P may include a first subpixel SP1, a second subpixel SP2, a third subpixel SP3, and a fourth subpixel SP4. The first subpixel SP1 includes a first light emission area EA1 emitting first color light, the second subpixel SP2 includes a second light emission area EA2 emitting second color light, the third subpixel SP3 may include a third light emission area EA3 emitting third color light, and the fourth subpixel SP4 may include a fourth light emission area EA4 emitting fourth color light. For example, the first to fourth light emission areas EA1, EA2, EA3, and EA4 may emit light of different colors. As one example, the first light emission area EA1 may emit green light, the second light emission area EA2 may emit red light, the third light emission area EA3 may emit blue light, and the fourth light emission area EA4 may emit white light, but not limited thereto. In addition, the arrangement order or arrangement form of each of the subpixels SP1, SP2, SP3, and SP4 may vary widely.

In the display panel 110 according to the embodiment of the present disclosure, the pixel P is disposed between the adjacent transmission areas TA, and the pixel P may include the light emission area EA1, EA2, EA3, and EA4 in which a light emission element is disposed to emit light. Since the size of the non-transmission area NTA is small in the display panel 110, a circuit element may be disposed while being overlapped with the light emission area EA1, EA2, EA3, and EA4. That is, the light emission areas EA1, EA2, EA3, and EA4 may include circuit areas CA1, CA2, CA3, and CA4 in which the circuit element is disposed.

Figure 3:
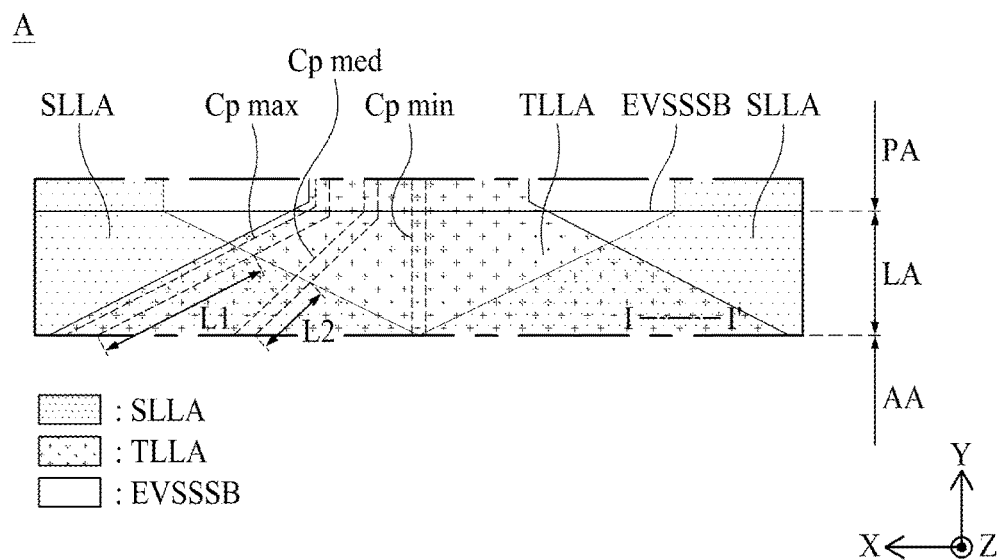
FIG. 3 is a plan view illustrating an example of a touch link area, a signal link area, and a common power shorting bar included in the area A of FIG. 1.
Figure 4:
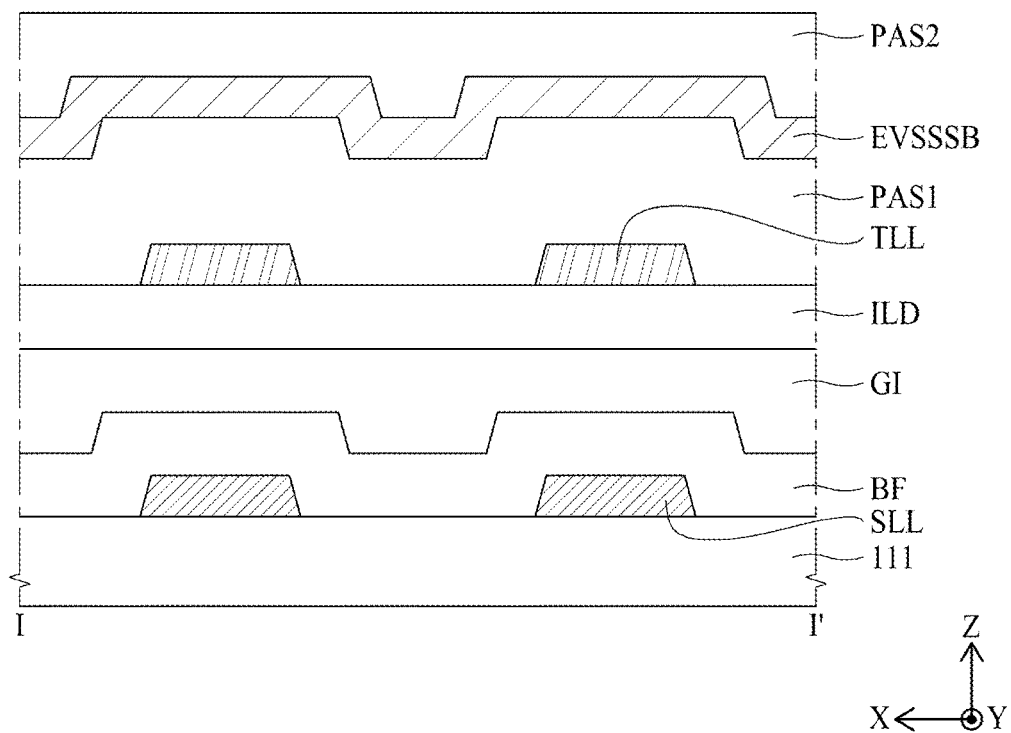
FIG. 4 is a cross-sectional view illustrating an example along I-I' of FIG. 3.

FIG. 3 is a plan view illustrating one example of a touch link area, a signal link area and a common power shorting bar included in the area A of FIG. 1, and FIG. 4 is a cross-sectional view illustrating one example along I-I' of FIG. 3.

Referring to FIGS. 3 and 4 in connection with FIG. 1, the display panel 110 according to the embodiment of the present disclosure may include the display area AA and the pad portion PA and the link area LA disposed in the non-display area NA. The link area LA may be provided in the non-display area NA and may be disposed between the pad portion PA and the display area AA. The link area LA may include the signal link area SLLA in which the plurality of signal link lines SLL are disposed, and the touch link area TLLA in which the plurality of touch link lines TLL are disposed. Also, the link area LA of the display panel 110 may include the common power shorting bar EVSSSB overlapped with the plurality of signal link lines SLL and the plurality of touch link lines TLL.

In the pad portion PA, the plurality of pads, to which an external signal is applied from the non-display area NA, may be disposed therein. Also, the pad portion PA may include a signal pad for applying signals to the first signal lines SL1 and a touch pad for applying signals to the touch lines TL.

The signal pad and the touch pad are provided over the pad portion PA and are not overlapped with each other. The plurality of signal link lines SLL may be connected to the signal pad, and the plurality of touch link lines TLL may be connected to the touch pad. The plurality of signal link lines SLL and the plurality of touch link lines TLL are provided over the pad portion PA and are not overlapped with each other.

In the signal link area SLLA, the plurality of signal link lines SLL may be disposed to connect the pad portion PA and the plurality of first signal lines SL disposed in the display area AA. The plurality of signal link lines SLL disposed in the signal link area SLLA may connect the pad portion PA to the plurality of signal lines SL by a one-to-one correspondence. An interval between each of the plurality of signal link lines SLL may be gradually increased as it becomes close to the display area AA from the pad portion PA. The signal link area SLLA may be expanded in its size as it becomes close to the display area AA from the pad portion PA. For example, the signal link area SLLA may have a trapezoidal shape in which a width contacting the pad portion PA is smaller than a width contacting the display area AA.

In the touch link area TLLA, there are the plurality of touch link lines TLL for connecting the pad portion PA and the plurality of touch lines TL in the display area AA. The plurality of touch link lines TLL disposed in the touch link area TLLA may connect the pad portion PA and the plurality of touch lines TL by a one-to one correspondence (1:1). An interval between each of the plurality of touch link lines TLL may be gradually increased as it becomes close to the display area AA from the pad portion PA. The touch link area TLLA may be expanded in its size as it becomes close to the display area AA from the pad portion PA. For example, the touch link area TLLA may have a trapezoidal shape in which a width contacting the pad portion PA is smaller than a width contacting the display area AA.

Touch link area TLLA and the signal link area SLLA may be partially overlapped with each other. Each of the touch link area TLLA and the signal link area SLLA may extend from the pad portion PA to the display area AA. Accordingly, the area of the touch link area TLLA and the signal link area SLLA may be increased from the pad portion PA to the display area AA. The touch link line TLL and the signal link line SLL disposed in an area where the touch link area TLLA and the signal link area SLLA overlap each other may overlap, e.g., cross, each other. The touch link line TLL disposed in the area where the touch link area TLLA and the signal link area SLLA overlap each other may have the increased or decreased number of signal link lines SLL that overlap, e.g., cross, according to the overlap with the signal link area SLLA.

The touch link line TLL, which is not overlapped with the signal link area SLLA in the touch link area TLLA or is disposed in a small portion, is not overlapped with the signal link line SLL, or the number of signal link lines SLL being overlapped with the touch link line TLL may be small. For example, as shown in FIG. 3, the center of the touch link area TLLA may not overlap the signal link area SLLA, and the touch link line TLL disposed in the center of the touch link area TLLA may not overlap the signal link line SLL.

According as the touch link line TLL disposed in the area overlapped with the signal link area SLLA of the touch link area TLLA is increased in its overlapping area with the signal link area SLLA, the number of signal link lines SLL overlapped may be increased. Meanwhile, according as the touch link line TTL is decreased in its overlapping area with the signal link area SLLA, the number of signal link lines SLL overlapped may be reduced. For example, as shown in FIG. 3, the outermost portion of the touch link area TLLA may have a maximum area that overlaps the signal link area SLLA, and the touch link line TLL disposed in the outermost portion of the touch link area TLLA may have the largest number of signal link lines overlapped. Also, the overlapping area with the signal link area SLLA may be reduced from the outermost portion of the touch link area TLLA toward the center of the touch link area TLLA. According as it becomes close to the center of the touch link area TLLA from the outermost portion of the touch link area TLLA, the touch link line TLL may have the reduced number of signal link lines SLL overlapped.

The common power shorting bar EVSSSB may be disposed between the pad portion PA and the display area AA. The area in which the common power shorting bar EVSSSB is disposed may be an area between the pad portion PA and the display area AA, but may vary depending on a length of the link area LA. The common power shorting bar EVSSSB may apply common power to a common electrode layer (or cathode electrode) in the display area AA. For example, the common electrode layer may be overlapped with the display area AA and may be disposed while being partially overlapped with the non-display area NA, and the common power shorting bar EVSSSB may be in contact with the common electrode layer in the non-display area NA to supply common power to the common electrode layer. Alternatively or additionally, the common power shorting bar EVSSSB may be disposed while being partially overlapped with the display area AA, and the common power shorting bar EVSSSB may be in contact with the common electrode layer in the display area AA to supply common power to the common electrode layer.

Referring to FIG. 4, the link area LA between the pad portion PA and the display area AA of the display panel 110 may include a substrate 111, a signal link line SLL, a buffer film BF, a gate insulating film GI, an interlayer insulating film ILD, a touch link line TLL, a first passivation film PA1, a common power shorting bar EVSSSB, and a second passivation film PAS2.

In detail, the signal link line SLL may be disposed over the substrate 111. The signal link line SLL may be provided in the same layer as a light shielding layer disposed in the display area AA of the substrate 111 and may be formed of the same material as the light shielding layer, but not necessarily. The light shielding layer blocks external light incident on an active layer of a thin film transistor disposed over the substrate 111. The signal link line SLL may be formed of a single-layered or multiple-layered structure of molybdenum Mo, aluminum Al, chromium Cr, gold Au, titanium Ti, nickel Ni, neodymium Nd, and copper Cu, or their alloys.

In the display panel 110 according to the embodiment of the present disclosure, at least a portion of the pixel power line VDD, the common power line VSS, the reference line REF, the data line DL, the touch line TL, and the touch link line TLL may be provided in the same layer as the signal link line SLL and the light shielding layer.

The buffer film BF may be disposed over the substrate 111 on which the signal link line SLL and the light shielding layer are disposed. The buffer film BF is provided to protect the thin film transistor from moisture penetrating through the substrate 111 which is vulnerable to moisture permeation, wherein the buffer film BF may be formed of an inorganic film, for example, a silicon oxide film SiOx, a silicon nitride film SiNx, or a multi-layer thereof.

An active layer of the thin film transistor may be disposed over the buffer film BF. The active layer may be formed of a silicon-based semiconductor material or an oxide-based semiconductor material. Also, a gate insulating film GI may be disposed over the buffer film BF. The gate insulating film GI may be formed of an inorganic film, for example, a silicon oxide film SiOx, a silicon nitride film SiNx, or a multi-layer thereof.

A gate electrode of the thin film transistor may be disposed over the gate insulating film GI. The gate electrode may be formed of a single-layered or multiple-layered structure of molybdenum Mo, aluminum Al, chromium Cr, gold Au, titanium Ti, nickel Ni, neodymium Nd, copper Cu or their alloys.

In the display panel 110 according to the embodiment of the present disclosure, at least a portion of the pixel power line VDD, the common power line VSS, the reference line REF, the data line DL, the touch line TL, the touch link line TLL, and the signal link line SLL may be provided in the same layer as the gate electrode. For example, the scan line SCANL disposed in the display area AA may be provided in the same layer as the gate electrode and may be formed of the same material as the gate electrode, but not limited thereto.

The interlayer insulating film ILD may be disposed over the gate insulating film GI. The interlayer insulating film ILD layer may be formed of an inorganic film, for example, a silicon oxide film SiOx, a silicon nitride film SiNx, or a multi-layer thereof.

The touch link line TLL may be disposed over the interlayer insulating film ILD. The touch link line TLL may be provided in the same layer as first and second source/drain electrodes disposed in the display area AA of the substrate 111 and may be formed of the same material as the first and second source/drain electrodes, but not necessarily. The first and second source/drain electrodes may be connected to the active layer of the thin film transistor through a contact hole penetrating the gate insulating film GI and the interlayer insulating film ILD. The touch link line TLL may be formed of the same material as the first and second source/drain electrodes. For example, the touch link line TLL may be formed of a single-layered or multiple-layered structure of molybdenum Mo, aluminum Al, chromium Cr, gold Au, titanium Ti, nickel Ni, neodymium Nd, copper Cu or their alloys.

In the display panel 110 according to the embodiment of the present disclosure, at least a portion of the pixel power line VDD, the common power line VSS, the reference line REF, the data line DL, the touch line TL, and the signal link line SLL may be formed in the same layer as the touch link line TLL and the first and second source/drain electrodes.

A first passivation film PAS1 for insulating the thin film transistor may be disposed over the interlayer insulating film ILD provided with the touch link line TLL and the first and second source/drain electrodes. The first passivation film PAS1 may be formed of an inorganic film, for example, a silicon oxide film SiOx, a silicon nitride film SiNx, or a multi-layer thereof.

The common power shorting bar EVSSSB may be disposed over the first passivation film PAS1. The common power shorting bar EVSSSB may be formed of the same material as the first and second source/drain electrodes. For example, the common power shorting bar EVSSSB may be formed of a single-layered or multiple-layered structure of molybdenum Mo, aluminum Al, chromium Cr, gold Au, titanium Ti, nickel Ni, neodymium Nd, copper Cu or their alloys.

In the display panel 110 according to the embodiment of the present disclosure, at least a portion of the pixel power line VDD, the common power line VSS, the reference line REF, the data line DL, the touch line TL, the touch link line TLL, and the signal link line SLL may be formed in the same layer as the common power shorting bar EVSSSB.

A second passivation film PAS2 may be disposed over the first passivation film PAS1 on which the common power shorting bar EVSSSB is disposed. The second passivation film PAS2 may be formed of an inorganic film, for example, a silicon oxide film SiOx, a silicon nitride film SiNx, or a multi-layer thereof. The common power shorting bar EVSSSB may be connected to a common electrode layer (or cathode electrode) in the display area AA through a contact hole penetrating the second passivation film PAS2.

In the display panel 110 according to the embodiment of the present disclosure, the touch link line TLL and the signal link line SLL may be provided in the different layers from each other and may be partially overlapped with each other. Also, the common power shorting bar EVSSSB may be provided in the different layer from the touch link line TLL and the signal link line SLL and may be partially overlapped with the touch link line TLL and the signal link line SLL. For example, the signal link line SLL is disposed over the substrate 111, and the touch link line TLL is disposed above the signal link line SLL, wherein the buffer film BL, the gate insulating film GI and the interlayer insulating film ILD may be provided between the signal link line SLL and the touch link line TLL. Also, the common power shorting bar EVSSSB may be disposed above the touch link line TLL with the first passivation film PAS1 interposed therebetween. However, it is not limited to this structure.

As shown in FIGS. 3 and 4, in the display panel 110 according to the embodiment of the present disclosure, the touch link area TLLA and the signal link area SLLA may be partially overlapped with each other, and a parasitic capacitance may be formed between the touch link line TLL disposed in the touch link area TLLA and the signal link line SLL disposed in the signal link area SLLA. Also, the touch link line TLL disposed in the area where the touch link area TLLA and the signal link area SLLA overlap each other may have the increased or decreased number of signal link lines SLL that overlap in accordance with the overlapping area with the signal link area SLLA. The touch link line TLL may have the different number of signal link lines SLL overlapped depending on the position of the touch link area TLLA, whereby a deviation of the parasitic capacitance according to the position of the touch link line TTL may occur.

For example, the touch link area TLLA may be disposed between adjacent signal link areas SLLA, as shown in FIG. 3. At this time, the center of the touch link area TLLA may correspond to the area which is overlapped with the signal link area SLLA at the minimum level and may correspond to the minimum parasitic capacitance area Cp min in which the parasitic capacitance is reduced. Also, the outermost portion of the touch link area TLLA may correspond to the area (or length L1) which is overlapped with the signal link area SLLA at the maximum level and may correspond to the maximum parasitic capacitance area CP max in which the parasitic capacitance is increased. Also, the area between the center of the touch link area TLLA and the outermost portion of the touch link area TLLA may correspond to the intermediate area (or length L2) and may correspond to the intermediate parasitic capacitance area CP med where the parasitic capacitance is generated at the intermediate level between the minimum parasitic capacitance level and the maximum parasitic capacitance level. However, it is not limited thereto.

As described above, the plurality of touch link lines TLL disposed in the touch link area TLLA may have the deviation in parasitic capacitance due to the degree of the overlap with the signal link area SLLA according to the position of the touch link area TLLA, whereby it may deteriorate the touch sensing performance.

In the display panel 110 according to the embodiment of the present disclosure, a compensation pattern, which sets an appropriate compensation capacitance on the basis of the overlap between the plurality of signal link lines SLL and the touch link line TLL corresponding to at least one of the plurality of touch lines TL, is additionally arranged in order to compensate for the deviation of the parasitic capacitance according to the position of the plurality of touch link lines TLL so that it is possible to compensate for the deviation of the parasitic capacitance caused by the overlap difference between the touch link line TLL and the signal link line SLL, thereby improving the touch sensing performance.

Hereinafter, the compensation pattern capable of compensating for the deviation of parasitic capacitance in the display panel 110 according to the embodiment of the present disclosure will be described in detail with reference to FIGS. 5 to 6C.

Figure 5:
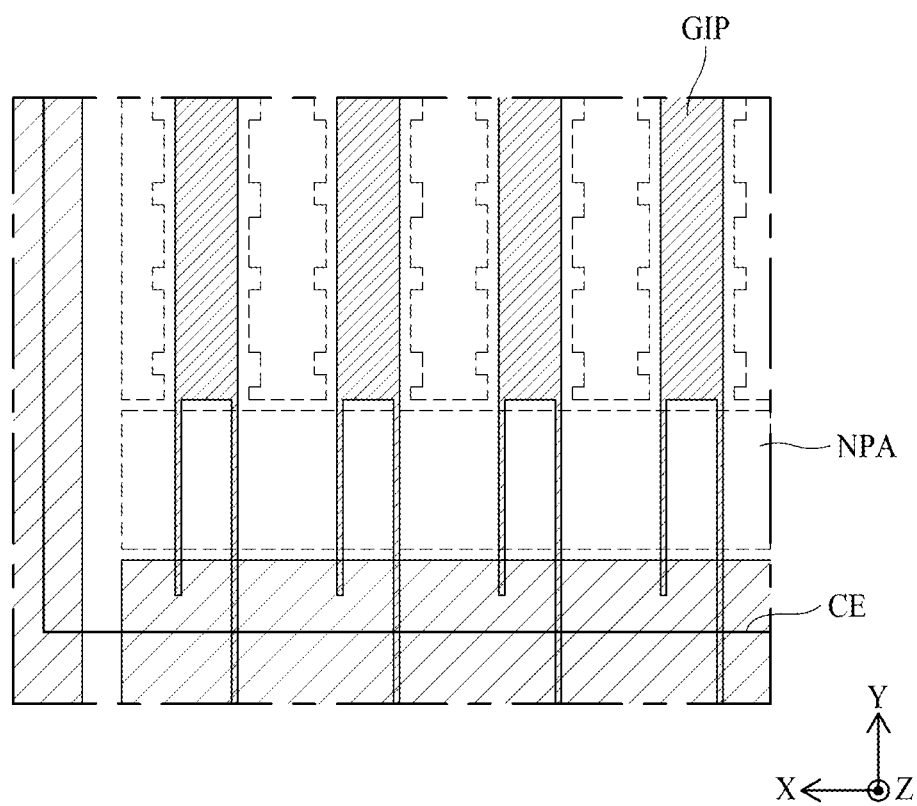
FIG. 5 is a plan view illustrating an example of a non-pad area disposed in the area B of FIG. 1.

FIG. 5 is a plan view illustrating an example of the non-pad area disposed in the area B of FIG. 1. FIG. 6A is a plan view illustrating an example of the compensation pattern disposed in the area C of FIG. 1. FIG. 6B is a plan view illustrating an example of the compensation pattern disposed in the area D of FIG. 1. FIG. 6C is a plan view illustrating an example of the compensation pattern disposed in the area E of FIG. 1.

Referring to FIGS. 5 to 6C in connection with FIGS. 1 to 4, in order to compensate for the deviation of the parasitic capacitance according to the position of the plurality of touch link lines TLL, the display panel 110 according to the embodiment of the present disclosure may include the compensation pattern TL_CP1, TL_CP2, and TL_CP3, which may set the appropriate compensation capacitance on the basis of the overlap between the plurality of signal link lines SLL and the touch link line TLL corresponding to at least one of the plurality of touch lines TL.

The compensation pattern TL_CP1, TL_CP2, and TL_CP3 may be disposed in the non-display area NA and may be connected to at least one of the plurality of touch lines TL in the display area AA. For example, the compensation pattern TL_CP1, TL_CP2, and TL_CP3 may be disposed in the non-pad portion NPA in the non-display area NA confronting the pad portion PA with the display area AA interposed therebetween and may be connected to at least one of the plurality of touch lines TL in the display area AA.

As shown in FIG. 5, the non-pad portion NPA may be disposed between the boundary of the display area AA and the bezel area of the display panel 110. The common electrode layer (or cathode electrode) CE may be disposed over the non-pad portion NPA, wherein the common electrode layer may be overlapped with the display area AA and may be partially overlapped with the non-display area NA. Also, other configurations other than the common electrode layer CE and power line connected to a GIP circuit (or pixel circuit) of the display area AA and configured to supply power thereto may not be disposed in the non-pad portion NPA. For example, the non-pad portion NPA may be provided in the non-display area NA of the display panel 110, and may be disposed in the corresponding area opposite to the pad portion PA. The non-pad portion NPA may be provided in the non-display area NA of the display panel 110 and may be disposed to be opposite to the pad portion PA with the display area AA interposed in-between.

In the display panel 110 according to the embodiment of the present disclosure, the compensation pattern TL_CP1, TL_CP2, and TL_CP3 is disposed in the non-pad portion NPA so that various types of patterns may be designed while reducing and/or minimizing the influence on other configurations, thereby forming a compensation capacitance adjusted by the common electrode layer CE. For example, in case of the area between the pad portion PA and the display area AA, the corresponding area may be overlapped with or disposed adjacent to the touch link line TLL and the signal link line SLL, whereby the area between the pad portion PA and the display area AA is not enough for the compensation pattern. If the compensation pattern is disposed in the area between the pad portion PA and the display area AA, there is a possibility of touch noise caused by the interference with the touch link line TLL and the signal link line SLL. Accordingly, in the display panel 110 according to the embodiment of the present disclosure, the compensation pattern TL_CP1, TL_CP2 and TL_CP3 is disposed in the non-pad portion NPA, so that it is possible to reduce touch noise by reducing and/or minimizing the interference with the touch link line TLL and the signal link line SLL and to compensate for the capacitance deviation for each touch link line by securing the enough space for the design of the compensation pattern.

Also, according as the compensation pattern TL_CP1, TL_CP2, and TL_CP3 is disposed in the non-pad portion NPA of the display panel 110 according to the embodiment of the present disclosure, it is possible to complement a function of a dam formed in the bezel area of the display panel 110 and to compensate for a step coverage with the non-display area NA in other sides of the display panel 110. Accordingly, the compensation pattern TL_CP1, TL_CP2, and TL_CP3 may improve an overflow prevention function of the dam DAM of the display panel 110 and improve uniformity in formation of the dam DAM.

Referring to FIGS. 6A to 6C in connection with FIG. 1, the display panel 110 according to the embodiment of the present disclosure may include pixels P, a touch line TL, first signal lines SL1, and second signal lines SL2 in the display area AA.

The pixel P is disposed at every crossing area where the first signal line SL1 and the second signal line SL2 cross each other and may emit light to display an image. The pixel P may include a first subpixel SP1, a second subpixel SP2, a third subpixel SP3, and a fourth subpixel SP4. The first subpixel SP1 may emit first color light, the second subpixel SP2 may emit second color light, the third subpixel SP3 may emit third color light, and the fourth subpixel SP4 may emit fourth color light. For example, the first to fourth subpixels SP1, SP2, SP3, and SP4 may all emit light of different colors. For example, the first subpixel SP1 may emit green light, the second subpixel SP2 may emit red light, the third subpixel SP3 may emit blue light, and the fourth subpixel SP4 may emit white light, but not limited thereto. In addition, the arrangement order or arrangement form of each of the subpixels SP1, SP2, SP3, and SP4 may vary widely.

The pixel P may include a light emission area in which a light emitting element is disposed to emit light. For example, the display panel 110 may be a transparent display panel which enables to see objects or images located behind the display panel 110 by transmitting light therethrough. In this case, the display panel 110 may include a transmission area TA for transmitting light, whereby the light emission area is reduced in its size. Also, the display panel 110 may include a circuit area CA1, CA2, CA3, and CA4 in which the circuit element is disposed to overlap the light emission area. For example, a non-transmission area NTA may be disposed between the adjacent transmission areas TA, and the pixel P and the plurality of signal lines SL1 and SL2 may be disposed.

The display panel 110 according to the embodiment of the present disclosure may include a touch line TL extending in the first direction (or Y-axis direction) in the display area AA. In addition, the display area AA may include the first signal lines SL1 extending in the first direction (or Y-axis direction) and the second signal lines SL2 extending in the second direction (or X-axis direction).

The first signal lines SL1 may include at least one of the pixel power line VDD, the common power line VSS, the reference line REF, and the data lines DL1, DL2, DL3, and DL4.

The pixel power line VDD may supply first power source to each of the subpixels SP1, SP2, SP3, and SP4 disposed in the display area AA. For example, the pixel power line VDD may supply first power source to the driving thin film transistor disposed in the circuit areas CA1, CA2, CA3, and CA4 of the respective subpixels SP1, SP2, SP3, and SP4.

The common power line VSS may supply second power source to the cathode electrode (or second electrode) of the subpixels SP1, SP2, SP3, and SP4 disposed in the display area AA. At this time, the second power source may be common power source commonly supplied to the subpixels SP1, SP2, SP3, and SP4.

The data lines DL1, DL2, DL3, and DL4 may supply a data voltage to each of the subpixels SP1, SP2, SP3, and SP4 disposed in the display area AA. For example, the data lines DL1, DL2, DL3, and DL4 may supply the data voltage to the driving thin film transistor disposed in each of the circuit areas CA1, CA2, CA3, and CA4 of the subpixels SP1, SP2, SP3, and SP4.

The reference line REF may supply an initialization voltage (or sensing voltage) to each of the subpixels SP1, SP2, SP3, and SP4 disposed in the display area AA. The reference line REF may be disposed between each of the plurality of data lines DL1, DL2, DL3, and DL4. For example, the reference line REF may be disposed in the center among the plurality of data lines DL1, DL2, DL3, and DL4, that is, between the second data line DL2 and the third data line DL3.

At least two touch lines TL may be disposed in one pixel P. The touch line TL may be disposed in different layers from the pixel power line VDD, the common power line VSS, the reference line REF, and the data lines DL1, DL2, DL3, and DL4 disposed in the pixel P. For example, at least some of the pixel power line VDD, the common power line VSS, the reference line REF, and the data lines DL1, DL2, DL3, and DL4 may be provided in the same layer as the light shielding layer over the substrate 111 and may be formed of the same material as the light shielding layer, and the touch line TL may be provided in the same layer as the first and second source/drain electrodes over the interlayer insulating film ILD layer and may be formed of the same material as the first and second source/drain electrodes over the interlayer insulating film ILD layer, but not limited thereto.

The second signal lines SL2 may include a scan line SCANL. The scan line SCANL may supply a scan signal to the subpixels SP1, SP2, SP3, and SP4 of the pixel P. For example, the scan line SCANL may be provided in the same layer as the gate electrode over the gate insulating film GI and may be formed of the same material as the gate electrode over the gate insulating film GI, but not limited thereto.

In the display panel 110 according to the embodiment of the present disclosure, the touch line TL is not overlapped with the circuit areas CA1, CA2, CA3, and CA4, thereby reducing and/or minimizing the influence of the circuit element and improving the uniformity of the parasitic capacitance.

In the display panel 110 according to the embodiment of the present disclosure, the compensation pattern TL_CP1, TL_CP2, and TL_CP3 may set the appropriate compensation capacitance on the basis of the overlap of the plurality of signal link lines SLL and the touch link line TLL corresponding to at least one of the plurality of touch lines TL. The compensation pattern TL_CP1, TL_CP2, and TL_CP3 may be connected to at least one of the plurality of touch lines TL in the display area AA, and may set the magnitude of the compensation capacitance based on the overlapping of the signal link line SLL and the touch link line TLL corresponding to the connected touch line TL.

Referring to FIG. 6A, the compensation pattern TL_CP1 of the display panel 110 according to the embodiment of the present disclosure may be connected to the touch line TL corresponding to the touch link line TLL disposed in the maximum parasitic capacitance area CP max of the touch link area TLLA, as shown in FIGS. 1 and 3. For example, the touch link line TLL disposed in the maximum parasitic capacitance area CP max may have the parasitic capacitance value which is greater than that of the touch link line TLL disposed in the other position since the touch link line TLL disposed in the maximum parasitic capacitance area CP max has the large number of the overlapped signal link lines SLL. Accordingly, the compensation pattern TL_CP1 may set the magnitude of the compensation capacitance so as to reduce the deviation of the parasitic capacitance of the touch link line TLL disposed in the other position. The compensation pattern TL_CP1 may be set to have the smaller compensation capacitance in comparison to that of the compensation pattern TL_CP2 and TL_CP3 connected to the touch link line TLL disposed in the other position.

The compensation pattern TL_CP1 may be the pattern extending and protruding from the touch line TL disposed in the display area AA to the non-pad portion NPA. The compensation pattern TL_CP1 may be provided in the same layer as the touch line TL and may be formed of the same material as the touch line TL. The compensation pattern TL_CP1 may be formed in a linear or zigzag shape so that the length or area protruding from the touch line TL may be varied. For example, the compensation pattern TL_CP1 may be formed in a shape having a minimum occupied area, with respect to the same area having the same horizontal length (a) and the vertical length (b), so that the compensation pattern TL_CP1 may be set to have the smaller compensation capacitance in comparison to that of the compensation pattern TL_CP2 and TL_CP3 disposed in another position. For example, the compensation pattern TL_CP1 may be in a linear shape or may be a zigzag shape which is bent at least once. Alternatively or additionally, the compensation pattern TL_CP1 may not protrude from the touch line TL, that is, it is possible not to provide the compensation pattern TL_CP1. However, it is not limited thereto.

Referring to FIG. 6B, the compensation pattern TL_CP2 of the display panel 110 according to the embodiment of the present disclosure may be connected to the touch line TL corresponding to the touch link line TLL disposed in the intermediate parasitic capacitance area CP med in the touch link area TLLA, as shown in FIGS. 1 and 3. For example, the touch link line TLL disposed in the intermediate parasitic capacitance area CP med has the parasitic capacitance value which is smaller than that of the touch link line TLL disposed in the maximum parasitic capacitance area CP max since the touch link line TLL disposed in the intermediate parasitic capacitance area CP med has the relatively smaller number of the overlapped signal link lines SLL in comparison to that of the touch link line TTL disposed in the maximum parasitic capacitance area CP max. Accordingly, the compensation pattern TL_CP2 may set the magnitude of the compensation capacitance so as to reduce the deviation of the parasitic capacitance of the touch link line TLL disposed in the other position including the maximum parasitic capacitance area CP max. The touch link line TLL disposed in the intermediate parasitic capacitance area CP med may generate the parasitic capacitance which is approximately the middle of the parasitic capacitance of the touch link line TLL between the maximum parasitic capacitance area CP max and the minimum parasitic capacitance area CP min. The compensation pattern TL_CP2 may set the magnitude of the compensation capacitance as the intermediate value between the compensation pattern TL_CP1 corresponding to the maximum parasitic capacitance area CP max and the compensation pattern TL_CP3 corresponding to the minimum parasitic capacitance area CP min.

The compensation pattern TL_CP2 may be the pattern extending and protruding from the touch line TL disposed in the display area AA to the non-pad portion NPA. The compensation pattern TL_CP2 may be provided in the same layer as the touch line TL and may be formed of the same material as the touch line TL. The compensation pattern TL_CP2 may be formed in a linear or zigzag shape so that the length or area protruding from the touch line TL may be varied. For example, the compensation pattern TL_CP2 may be formed in a shape having an intermediate occupied area, with respect to the same area having the same horizontal length (a) and the vertical length (b), so that the compensation pattern TL_CP2 may be set to have the intermediate value of the compensation capacitance between the compensation pattern TL_CP1 corresponding to the maximum parasitic capacitance area CP max and the compensation pattern TL_CP3 corresponding to the minimum parasitic capacitance area CP min. For example, the compensation pattern TL_CP2 may be formed in a linear shape whose length is relatively greater than that of the compensation pattern TL_CP1 or may be formed in a zigzag shape whose bent portions are greater than the compensation pattern TL_CP1, but not necessarily.

Referring to FIG. 6C, the compensation pattern TL_CP3 of the display panel 110 according to the embodiment of the present disclosure may be connected to the touch line TL corresponding to the touch link line TLL disposed in the minimum parasitic capacitance area CP min of the touch link area TLLA, as shown in FIGS. 1 and 3. For example, the touch link line TLL disposed in the minimum parasitic capacitance area CP min has the parasitic capacitance value which is smaller than that of the touch link line TLL disposed in the other position since the touch link line TLL disposed in the minimum parasitic capacitance area CP min has the small number of the overlapped signal link lines SLL. Accordingly, the compensation pattern TL_CP3 may set the magnitude of the compensation capacitance so as to reduce the deviation of the parasitic capacitance of the touch link line TLL disposed in the other position. The touch link line TLL disposed in the minimum parasitic capacitance area CP min may set the magnitude of the compensation capacitance to be larger than that of the compensation pattern TL_CP1 and TL_CP2 connected to the touch link line TLL disposed in other position.

The compensation pattern TL_CP3 may be the pattern extending and protruding from the touch line TL disposed in the display area AA to the non-pad portion NPA. The compensation pattern TL_CP3 may be provided in the same layer as the touch line TL and may be formed of the same material as the touch line TL. The compensation pattern TL_CP3 may be formed in a linear shape or zigzag shape so that the length or area protruding from the touch line TL may be varied. For example, the compensation pattern TL_CP3 may be formed in a shape having a maximum occupied area, with respect to the same area having the same horizontal length (a) and the vertical length (b), so that the compensation pattern TL_CP3 may be set to have the larger compensation capacitance in comparison to that of the compensation pattern TL_CP1 and TL_CP2 disposed in other position. For example, the compensation pattern TL_CP3 may be formed in a linear shape whose length is relatively greater than that of the compensation pattern TL_CP2 or may be formed in a zigzag shape whose bent portions are greater than the compensation pattern TL_CP2, but not necessarily.

According to the embodiment of the present disclosure, in order to compensate for the deviation of the parasitic capacitance according to the position of the plurality of touch link lines TLL, the display panel 110 additionally arranges the compensation patterns TL_CP1, TL_CP2, and TL_CP3 which set the appropriate compensation capacitance on the basis of the overlapping of the plurality of signal link lines SLL and the touch link line TLL corresponding to at least one of the plurality of touch lines TL, thereby improving the touch sensing performance by compensating for the deviation of the parasitic capacitance caused by the overlap difference between the touch link line TLL and the signal link line SLL.

Figure 7A:
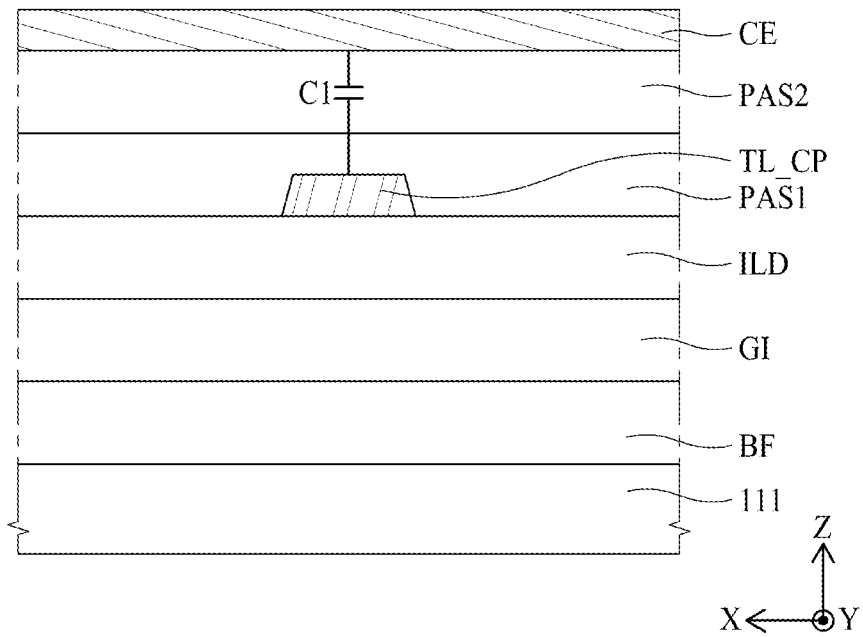
FIG. 7A is a cross-sectional view illustrating an example along II-IF of FIG. 6A.
Figure 7B:
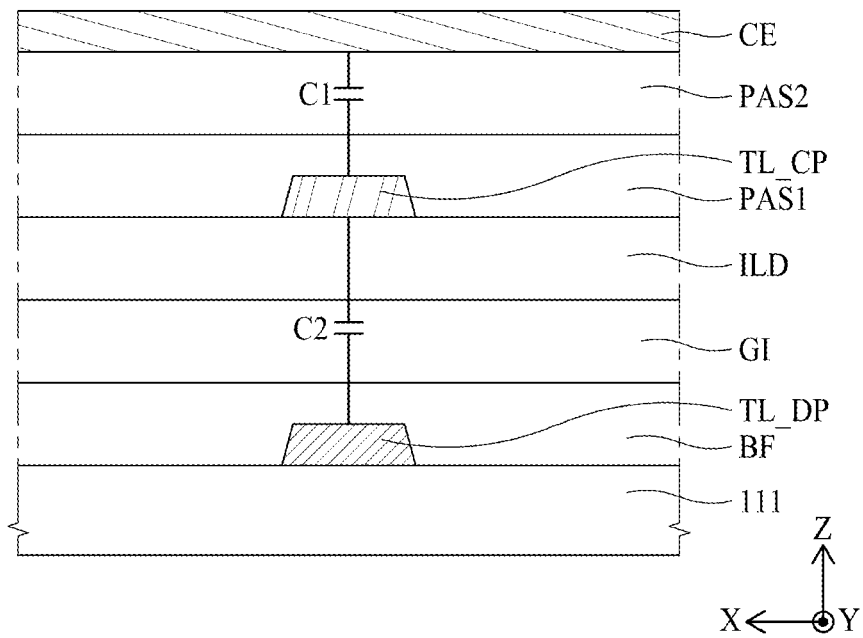
FIG. 7B is a cross-sectional view illustrating another example along II-IF of FIG. 6A.
Figure 7C:
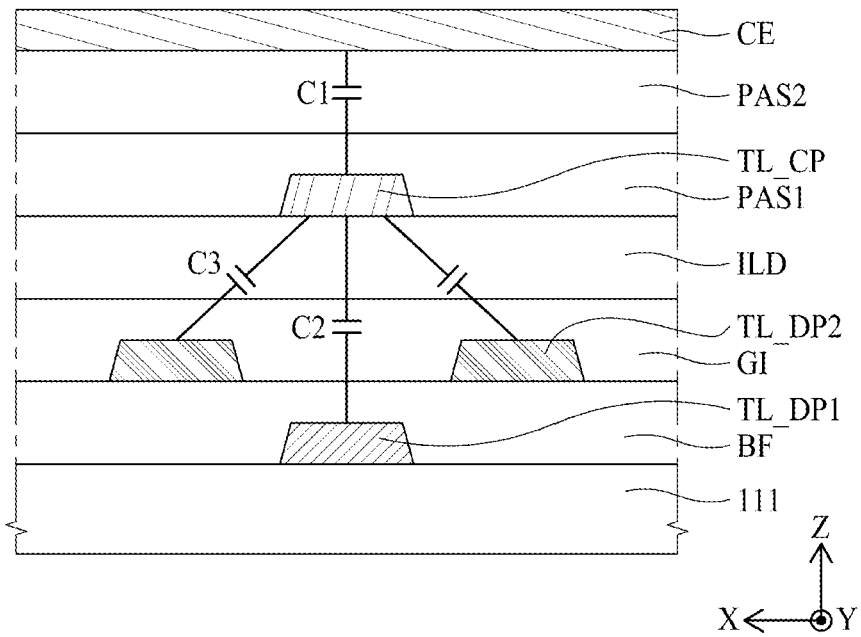
FIG. 7C is a cross-sectional view illustrating another example along II-IF of FIG. 6A.
Figure 7D:
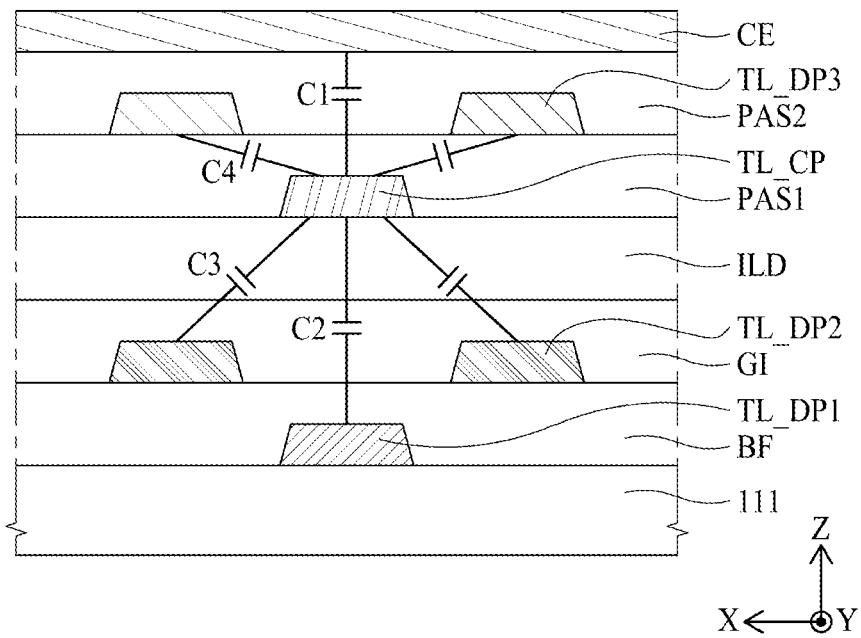
FIG. 7D is a cross-sectional view illustrating another example along II-IF of FIG. 6A.

FIG. 7A is a cross-sectional view illustrating an example along II-IP of FIG. 6A, FIG. 7B is a cross-sectional view illustrating another example along II-IP of FIG. 6A, FIG. 7C is a cross-sectional view illustrating another example along II-IP of FIG. 6A, and FIG. 7D is a cross-sectional view illustrating another example along II-IP of FIG. 6A.

Referring to FIGS. 7A to 7D in connection with FIG. 4, the non-pad portion NPA of the display panel 110 according to the embodiment of the present disclosure may include a substrate 111, a buffer film BF, a gate insulating film GI, an interlayer insulating film (or interlayer dielectric) ILD, a first passivation film PAS1, a second passivation film PAS2, and a common electrode layer CE, and may include a compensation pattern TL_CP, a dummy compensation pattern TL_DP1, and an auxiliary dummy compensation pattern TL_DP2 and TL_DP3 disposed over at least a portion of the substrate 111, the buffer film BF, the gate insulating film GI, the interlayer insulating film ILD, the first passivation film PAS1, and the second passivation film PAS2.

Referring to FIG. 7A, the compensation pattern TL_CP of the display panel 110 according to the embodiment of the present disclosure may be disposed over the interlayer insulating film ILD. The compensation pattern TL_CP may be overlapped with a common electrode layer CE (or cathode electrode) disposed over the second passivation film PAS2, and a compensation capacitance C1 may be formed between the common electrode layer CE and the compensation pattern TL_CP. The compensation pattern TL_CP may be the pattern extending and protruding from the touch line TL disposed in the display area AA. The compensation pattern TL_CP may be provided in the same layer as the touch line TL and may be formed of the same material as the touch line TL, but not limited thereto. The touch line TL and the compensation pattern TL_CP may be provided in the same layer as the light shielding layer over the substrate 111 and may be formed of the same material as the light shielding layer, or may be provided in the same layer as the gate electrode over the gate insulating film GI and may be formed of the same material as the gate electrode, or may be provided in the same layer as the common power shorting bar EVSSSB over the first passivation film PAS1 and may be formed of the same material as the common power shorting bar EVSSSB.

The compensation pattern TL_CP may set a magnitude of a compensation capacitance value between the common electrode layer CE and the compensation pattern TL_CP depending on the position of the compensation pattern TL_CP in the substrate 111, the buffer film BF, the gate insulating film GI, the interlayer insulating film ILD, the first passivation film PAS1, and the second passivation film PAS2. For example, the compensation pattern TL_CP may set the compensation capacitance value according to a vertical distance with the common electrode layer CE. For example, when the compensation pattern TL_CP is disposed over the substrate 111, the compensation capacitance value may be set to be the smallest. Meanwhile, when the compensation pattern TL_CP is disposed over the first passivation film PAS1, the compensation capacitance value may be set to be the largest.

Referring to FIG. 7B, the display panel 110 according to the embodiment of the present disclosure may further include the dummy compensation pattern TL_DP in addition to the compensation pattern TL_CP. The compensation pattern TL_CP may be disposed over the interlayer insulating film ILD, and the dummy compensation pattern TL_DP may be disposed over the substrate 111, but not limited thereto. The dummy compensation pattern TL_DP may be variously arranged over a portion of the substrate 111, the buffer film BF, the gate insulating film GI, the interlayer insulating film ILD, the first passivation film PAS1, and the second passivation film PAS2.

The dummy compensation pattern TL_DP may be provided in the same layer as the light shielding layer and may be formed of the same material as the light shielding layer, but not limited thereto. The dummy compensation pattern TL_DP may be overlapped with the compensation pattern TL_CP. In addition, the dummy compensation pattern TL_DP may be an electrically floated island electrode pattern.

The compensation pattern TL_CP may be disposed between the common electrode layer CE and the dummy compensation pattern TL_DP, wherein a first compensation capacitance C1 may be formed between the common electrode layer CE and the compensation pattern TL_CP, and a second compensation capacitance C2 may be formed between the dummy compensation pattern TL_DP and the compensation pattern TL_CP. The first compensation capacitance C1 may be greater than or equal to the second compensation capacitance C2, and the second compensation capacitance C2 may serve to assist the first compensation capacitance C1.

Referring to FIG. 7C, the display panel 110 according to the embodiment of the present disclosure may further include the dummy compensation pattern TL_DP1 and the auxiliary dummy compensation pattern TL_DP2 in addition to the compensation pattern TL_CP. The compensation pattern TL_CP may be disposed over the interlayer insulating film ILD, and the dummy compensation pattern TL_DP1 may be disposed over the substrate 111, and the auxiliary dummy compensation pattern TL_DP2 may be disposed over the buffer film BF, but not limited thereto. The dummy compensation pattern TL_DP1 and the auxiliary dummy compensation pattern TL_DP2 may be variously arranged over a portion of the substrate 111, the buffer film BF, the gate insulating film GI, the interlayer insulating film ILD, the first passivation film PAS1, and the second passivation film PAS2.

The dummy compensation pattern TL_DP1 may be provided in the same layer as the light shielding layer over the substrate 111 and may be formed of the same material as the light shielding layer, but not necessarily. The dummy compensation pattern TL_DP1 may be disposed while being overlapped with the compensation pattern TL_CP. Also, the dummy compensation pattern TL_DP1 may be an electrically floated island electrode pattern.

The auxiliary dummy compensation pattern TL_DP2 may be provided in the same layer as the gate electrode over the buffer film BF and may be formed of the same material as the gate electrode, but not limited thereto. The auxiliary dummy compensation pattern TL_DP2 is not overlapped with the compensation pattern TL_CP and the dummy compensation pattern TL_DP1, and may be arranged in parallel with the compensation pattern TL_CP. In addition, the auxiliary dummy compensation pattern TL_DP2 may be an electrically floated island electrode pattern.

The compensation pattern TL_CP may be disposed between the common electrode layer CE and the dummy compensation pattern TL_DP1. Further, the auxiliary dummy compensation pattern TL_DP2 may be disposed between the compensation pattern TL_CP and the dummy compensation pattern TL_DP1.

A first compensation capacitance C1 may be formed between the compensation pattern TL_CP and the common electrode layer CE, a second compensation capacitance C2 may be formed between the compensation pattern TL_CP and the dummy compensation pattern TL_DP1, and a third compensation capacitance C3 may be formed between the compensation pattern TL_CP and the auxiliary dummy compensation pattern TL_DP2. The first compensation capacitance C1 may be greater than or equal to each of the second compensation capacitance C2 and the third compensation capacitance C3, and the second and third compensation capacitances C2 and C3 may serve to assist the first compensation capacitance C1.

Referring to FIG. 7D, the display panel 110 according to the embodiment of the present disclosure may further include a dummy compensation pattern TL_DP1, a first auxiliary dummy compensation pattern TL_DP2, and a second auxiliary dummy compensation pattern TL_DP3 in addition to the compensation pattern TL_CP. The compensation pattern TL_CP may be disposed over the interlayer insulating film ILD, the dummy compensation pattern TL_DP1 may be disposed over the substrate 111, the first auxiliary dummy compensation pattern TL_DP2 may be disposed over the buffer film BF, and the second auxiliary dummy compensation pattern TL_DP3 may be disposed over the first passivation film PAS1, but not limited thereto. The dummy compensation pattern TL_DP1, the first auxiliary dummy compensation pattern TL_DP2, and the second auxiliary dummy compensation pattern TL_DP3 may be variously arranged over a portion of the substrate 111, the buffer film BF, the gate insulating film GI, the interlayer insulating film ILD, the first passivation film PAS1, and the second passivation film PAS2.

The dummy compensation pattern TL_DP1 may be provided in the same layer as the light shielding layer over the substrate 111 may be formed of the same material as the light shielding layer, but not limited thereto. The dummy compensation pattern TL_DP1 may be overlapped with the compensation pattern TL_CP. Further, the dummy compensation pattern TL_DP1 may be an electrically floated island electrode pattern.

The first auxiliary dummy compensation pattern TL_DP2 may be provided in the same layer as the gate electrode over the buffer film BF and may be formed of the same material as the gate electrode, but not limited thereto. The first auxiliary dummy compensation pattern TL_DP2 may not overlap the compensation pattern TL_CP and the dummy compensation pattern TL_DP1, and may be arranged in parallel with the compensation pattern TL_CP. Also, the first auxiliary dummy compensation pattern TL_DP2 may be an electrically floated island electrode pattern.

The second auxiliary dummy compensation pattern TL_DP3 may be provided in the same layer as the common power shorting bar EVSSSB and may be formed of the same material as the common power shorting bar EVSSSB, but not limited thereto. The second auxiliary dummy compensation pattern TL_DP3 is not overlapped with the compensation pattern TL_CP and the dummy compensation pattern TL_DP1, and may be arranged in parallel with the compensation pattern TL_CP. Also, the second auxiliary dummy compensation pattern TL_DP3 may be overlapped with the first auxiliary dummy compensation pattern TL_DP2. In addition, the second auxiliary dummy compensation pattern TL_DP3 may be an electrically floated island electrode pattern.

The compensation pattern TL_CP may be disposed between the common electrode layer CE and the dummy compensation pattern TL_DP1. In addition, the first auxiliary dummy compensation pattern TL_DP2 may be disposed between the compensation pattern TL_CP and the dummy compensation pattern TL_DP1, and the second auxiliary dummy compensation pattern TL_DP3 may be disposed between the compensation pattern TL_CP and the common electrode layer CE.

A first compensation capacitance C1 may be formed between the compensation pattern TL_CP and the common electrode layer CE, a second compensation capacitance C2 may be formed between the compensation pattern TL_CP and the dummy compensation pattern TL_DP1, a third compensation capacitance C3 may be formed between the compensation pattern TL_CP and the first auxiliary dummy compensation pattern TL_DP2, and a fourth compensation capacitance C4 may be formed between the compensation pattern TL_CP and the second auxiliary dummy compensation pattern TL_DP3. The first compensation capacitance C1 may be greater than or equal to each of the second compensation capacitance C2, the third compensation capacitance C3 and the fourth compensation capacitance C4, and the second, third and fourth compensation capacitances C2, C3 and C4 may serve to assist the first compensation capacitance C1.

In order to compensate for the deviation of the parasitic capacitance according to the position of the plurality of touch link lines TLL, the display panel 110 according to the embodiment of the present disclosure additionally arranges the compensation pattern TL_CP, the dummy compensation pattern TL_DP1 and the auxiliary dummy compensation pattern TL_DP2, and TL_DP3 capable of setting the appropriate compensation capacitance based on the overlapping between the plurality of signal link lines SLL and the touch link line TLL corresponding to at least one of the plurality of touch lines TL so that it is possible to improve the touch sensing performance by compensating for the deviation of the parasitic capacitance caused by the overlap difference between the touch link line TLL and the signal link line SLL.

In the display device according to the present disclosure, according as the compensation pattern capable of adjusting the compensation capacitance is disposed in the non-pad area corresponding to each touch link line, the interference between the touch link line and the signal link line is reduced so that it is possible to reduce touch noise and to compensate for the deviation of the capacitance caused by the overlap difference between the signal link line and the touch link line, thereby improving the touch sensing performance of the display device according to the present disclosure.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, it is intended that all variations or modifications derived from the meaning, scope, and equivalent concept of the claims fall within the scope of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
   a substrate including a display area and a non-display area surrounding the display area;
   a plurality of sub pixels disposed in the display area, and including a cathode electrode;
   a plurality of signal link lines disposed in the non-display area of the substrate and configured to connect a plurality of signal lines of the display area to a pad portion configured to receive an external signal;
   a plurality of touch link lines disposed in the non-display area, overlapped with at least some of the plurality of signal link lines and configured to connect the pad portion to a plurality of touch lines in the display area;
   a non-pad portion provided over the substrate and disposed in the non-display area facing the pad portion;
   a common electrode layer overlapped with the display area and partially overlapped with the non-display area,
   a compensation pattern disposed in the non-pad portion and connected with the at least one of the plurality of touch lines, and
   wherein the compensation pattern is overlapped with the common electrode layer, a compensation capacitance is formed between the compensation pattern and the common electrode layer, and the common electrode layer function as the cathode electrode of the plurality of the sub pixels.

2. The display device according to claim 1, wherein the plurality of signal link lines are disposed in a different layer from the plurality of touch link lines.

3. The display device according to claim 1, wherein the plurality of signal link lines and the plurality of touch link lines are not overlapped with one another on the pad portion.

4. The display device according to claim 1, wherein an interval between each two immediately adjacent ones of the plurality of signal link lines and an interval between each two immediately adjacent ones of the plurality of touch link lines increase as they become closer to the display area from the pad portion.

5. The display device according to claim 1, comprising a touch link area and a signal link area in a portion between the display area and the pad portion in the non-display area, wherein the plurality of touch link lines are disposed in the touch link area and the plurality of signal link lines are disposed in the signal link area, and
   wherein the touch link area and the signal link area are partially overlapped with each other.

6. The display device according to claim 5, wherein a size of each of the touch link area and the signal link area increases along a direction moving from the pad portion to the display area.

7. The display device according to claim 6, wherein an overlap area between the touch link area and the signal link area increases along a direction moving from the pad portion to the display area.

8. The display device according to claim 5, wherein a touch link line and a signal link line disposed in an overlap area between the touch link area and the signal link area overlap one another.

9. The display device according to claim 8, wherein the touch link line disposed in the overlap area between the touch link area and the signal link area overlaps with a number of signal link lines, the number of signal lines varying according to a size of the overlap area.

10. The display device according to claim 1, wherein the compensation pattern is disposed in the non-display area of the substrate and is connected with the at least one of the plurality of touch lines.

11. The display device according to claim 1, wherein the non-pad portion is opposite to where the pad portion is disposed in the non-display area of the substrate, with the display area interposed between the non-pad portion and the pad portion.

12. The display device according to claim 1, wherein the non-pad portion is disposed in the non-display area opposite to the pad portion with the display area interposed therebetween.

13. The display device according to claim 1, wherein the compensation pattern is connected with at least one of the plurality of touch lines, and is configured to set a compensation capacitance value based on the overlap.

14. The display device according to claim 13, wherein the compensation pattern extends and protrudes from the at least one of the plurality of the touch lines to the non-pad portion.

15. The display device according to claim 14, wherein the compensation pattern is formed in a linear or zigzag shape so that a protruding length or area of the compensation pattern protruding from the at least one of the plurality of the touch lines varies.

16. The display device according to claim 15, wherein the compensation pattern is provided in such a way that the protruding length or area varies according to the overlap between the at least one of the plurality of signal link lines and the at least one of the touch link lines.

17. The display device according to claim 1, further comprising a dummy compensation pattern overlapped with the compensation pattern in the non-pad portion, wherein the dummy compensation pattern is formed of an electrically floated island electrode pattern, and
wherein the compensation pattern is disposed between the common electrode layer and the dummy compensation pattern.

18. The display device according to claim 17, further comprising an auxiliary dummy compensation pattern which is not overlapped with the compensation pattern and the dummy compensation pattern in the non-pad portion and is spaced apart from the compensation pattern and parallel to the compensation pattern,
wherein the auxiliary dummy compensation pattern is formed of an electrically floated island electrode pattern, and the auxiliary dummy compensation pattern is disposed in at least one of an area between the compensation pattern and the common electrode layer and an area between the compensation pattern and the dummy compensation pattern.

19. The display device according to claim 1, wherein the non-display area further includes a common power shorting bar provided in a different layer from the plurality of signal link lines and the plurality of touch link lines, overlapped with the plurality of signal link lines and the plurality of touch link lines, and configured to apply a common power to the common electrode layer.

20. The display device according to claim 19, wherein the plurality of touch link lines are disposed between the common power shorting bar and the plurality of signal link lines.

21. The display device according to claim 1,
wherein the display area further includes:
a plurality of transmission areas; and
a non-transmission area disposed between the plurality of transmission areas, and configured to include a light emission area in which a light emitting element is disposed.

22. A display device comprising:
a substrate including a display area and a non-display area surrounding the display area;
a plurality of signal link lines disposed in the non-display area of the substrate and configured to connect a plurality of signal lines of the display area to a pad portion configured to receive an external signal;
a plurality of touch link lines disposed in the non-display area, overlapped with at least some of the plurality of signal link lines and configured to connect the pad portion to a plurality of touch lines in the display area;
a non-pad portion provided over the substrate and disposed in the non-display area facing the pad portion;
a compensation pattern on the non-pad portion and configured based on an overlap between at least one of the plurality of signal link lines and at least one of the plurality of touch link lines corresponding to at least one of the plurality of touch lines;
a common electrode layer overlapped with the display area and partially overlapped with the non-display area; and
a dummy compensation pattern overlapped with the compensation pattern in the non-pad portion,
wherein the dummy compensation pattern is formed of an electrically floated island electrode pattern, and
wherein the compensation pattern is disposed between the common electrode layer and the dummy compensation pattern, and is overlapped with the common electrode layer.

23. A display device comprising:
a substrate including a display area and a non-display area surrounding the display area;
a plurality of signal link lines disposed in the non-display area of the substrate and configured to connect a plurality of signal lines of the display area to a pad portion configured to receive an external signal;
a plurality of touch link lines disposed in the non-display area, overlapped with at least some of the plurality of signal link lines and configured to connect the pad portion to a plurality of touch lines in the display area;
a non-pad portion provided over the substrate and disposed in the non-display area facing the pad portion;
a compensation pattern disposed in the non-pad portion and connected with the at least one of the plurality of touch lines, the compensation portion configured based on an overlap between at least one of the plurality of signal link lines and at least one of the plurality of touch link lines corresponding to at least one of the plurality of touch lines;
a dummy compensation pattern overlapped with the compensation pattern in the non-pad portion; and
a common electrode layer overlapped with the display area and partially overlapped with the non-display area,
wherein the compensation pattern is overlapped with the common electrode layer, and a compensation capacitance is formed between the compensation pattern and the common electrode layer,
wherein the dummy compensation pattern is formed of an electrically floated island electrode pattern, and
wherein the compensation pattern is disposed between the common electrode layer and the dummy compensation pattern.

* * * * *